United States Patent [19]

Sato et al.

[11] 4,337,793

[45] Jul. 6, 1982

[54] COPPER-ALLOY TUBE WATER SUPPLY

[75] Inventors: Shiro Sato, Aichi; Kiyoji Sagisaka, Nagoya, both of Japan

[73] Assignee: Sumitomo Light Metal Industries, Ltd., Tokyo, Japan

[21] Appl. No.: 24,179

[22] Filed: Mar. 26, 1979

Related U.S. Application Data

[63] Continuation of Ser. No. 643,769, Dec. 23, 1975, abandoned.

[30] Foreign Application Priority Data

Dec. 23, 1974 [JP] Japan ............................. 49-147791

[51] Int. Cl.$^3$ .......................... E03B 7/04; F15B 1/00
[52] U.S. Cl. ................................ 137/561 R; 137/1; 138/177; 138/DIG. 6; 420/494
[58] Field of Search ............... 75/160, 161, 162, 153, 75/159, 164; 138/177, DIG. 6; 165/DIG. 8, 46, 51; 126/19.5; 137/1, 357, 801, 372, 561 R

[56] References Cited

U.S. PATENT DOCUMENTS

| | | | |
|---|---|---|---|
| 2,015,693 | 10/1935 | Perrin ................................... | 75/76 |
| 2,061,921 | 11/1936 | Roath ........................... | 138/DIG. 6 |
| 2,116,923 | 5/1938 | Bolton ................................ | 148/160 |
| 2,157,149 | 5/1939 | Smith .................................... | 75/160 |
| 2,164,065 | 6/1939 | Hensel et al. ......................... | 75/153 |
| 2,237,244 | 4/1941 | Wilkins ........................ | 148/12.7 C |
| 2,243,276 | 5/1941 | Hensel et al. ....................... | 75/153 |
| 2,851,353 | 9/1958 | Roach .................................. | 75/160 |
| 2,887,375 | 5/1959 | Bulow ................................. | 75/160 |
| 3,364,016 | 1/1968 | Mikawa ............................... | 75/159 |
| 3,677,745 | 7/1972 | Finlay et al. ......................... | 75/153 |
| 3,772,092 | 11/1973 | Shapiro et al. ....................... | 75/153 |
| 3,772,095 | 11/1973 | Shapiro et al. ....................... | 75/153 |
| 3,773,504 | 11/1973 | Niimi .................................... | 75/153 |
| 3,773,505 | 11/1973 | Nesslage .............................. | 75/164 |
| 3,824,135 | 7/1974 | Pryor et al. .......................... | 75/153 |
| 3,830,644 | 8/1974 | Watanabe et al. .................... | 75/153 |
| 3,901,692 | 8/1975 | Mikawa ............................... | 75/159 |
| 3,923,500 | 12/1975 | Kitzawa et al. ................... | 75/156.5 |
| 3,923,558 | 12/1975 | Shapiro et al. ....................... | 75/153 |

FOREIGN PATENT DOCUMENTS

| | | | |
|---|---|---|---|
| 47-20013 | 9/1972 | Japan .................................... | 75/153 |
| 1417467 | 12/1975 | United Kingdom .............. | 126/19.5 |
| 140837 | 11/1961 | U.S.S.R. ................................ | 75/76 |

OTHER PUBLICATIONS

Anaconda Tubes and Plates; Anaconda Publication B2, 5th Edition (1940), pp. 7-10.
Chambers Technical Dictionary, Edited by C. F. Tweney and L. E. C. Hughes, 1961, pp. 126 and 234.
A New Dictionary of Chemistry; Edited by L. Mackenzie, Miall, 1962, p. 151, Lines 47-59.

*Primary Examiner*—Michael L. Lewis
*Attorney, Agent, or Firm*—Browdy and Neimark

[57] ABSTRACT

Tubes for water and/or hot-water supply use, which are made of Cu-base-alloys essentially containing Mg from 0.05 to 2.8 wt % and the balance Cu and inevitable impurities, have been found to have conspicuously low dissolution rates of undesirable ions, especially Cu ions and other ions, even in stagnant water and/or at elevated temperature. The alloys are desirably further contain up to 1.0% Ca to further restrain dissolution of Cu ions.

7 Claims, No Drawings

4,337,793

COPPER-ALLOY TUBE WATER SUPPLY

This is a continuation, of application Ser. No. 643,769 filed Dec. 23, 1975, now abandoned.

FIELD OF THE INVENTION

The present invention relates to tubes or pipes to be used for water or hot-water supply, and particularly tubes having conspicuously low dissolution of copper or other elements thereof. For such purpose various kinds of tubes or pipes, e.g., copper tubes, steel pipes, steel pipes plated with zinc etc. have been used. The present invention aims to provide Cu-alloy tubes which greatly contribute to keeping supply water, especially for drinking, highly potable and moreover to enhancing the strength, the workability and productivity thereof.

BACKGROUND OF THE INVENTION

In recent years in many developed countries water supply sources have been tending to be deteriorated in quality or purity due to various causes, and moreover addition of chemicals into the water for keeping the water potable can be seen increasing in many water purification plants. This situation tends to increase, in turn, solubility in water of an element or elements of the material for water or hot-water supply tubes or pipes. From the standpoint of keeping water at a high quality level, civilized countries at the present time are under very undesirable circumstances. Zinc plated steel pipes, for example, which have traditionally been used for drinkable or potable clean water supply tend to have a very high concentration of zinc, which often results in a supply of white turbid water. In some regions the zinc coated pipes have been prohibited for use as supply pipes for drinkable clean water. Steel pipes as well have a high dissolution rate of iron, and especially when the water is temporarily staying or stagnant due to an interruption of water supply or some other reasons, the solubility so markedly rises as to make the water brown turbid. Even copper tubes which have been highly appreciated for their durability and workability can not be free from a problem of copper dissolution in water, which varies depending upon nature or quality of the water. In case water is staying in a copper tube the soluble rate of copper ions in the water comes to a high level. The soluble rate sometimes exceeds, for example in Japan, the allowable limit of copper dissolution rate in drinking water (Cu:1.0 ppm) which is stipulated by the Water-Supply Act, No. 11 Order of the Ministry of Health & Welfare, No. 177 Law of Japan enacted in November, 1957, and that still is preventing copper tubes from being widely used as tubes for drinkable clean water supply. It has been urgently required to develop practical or commercial materials for pipes or tubes and instruments usable for clean water supply including drinking water which materials are excellent in preventing the deterioration of the water or in keeping the water potable. The principal object of the present invention is to aim at the provision of such high quality Cu-alloy tubes for the use of water piping and such instruments, to meet this urgent requirement.

SUMMARY OF THE INVENTION

A primary object of this invention is, therefore, to provide an improved tube for drinkable clean water and/or hot-water supply, superior in the dissolution rate of the principal element or elements thereof into either running or stagnant water and thereby superior from the standpoint of sanitation and preservation of water quality.

Another object of this invention is to provide an improved instrument which comprises a tube or tubes of this invention and may be used for waterworks having the same advantage.

Still another object of this invention is to provide an improved tube superior in durability, workability, and manufacturing cost saving.

The essence of this invention for achieving these objects resides in the provision of a copper base alloy tube for water and/or hot-water supply, which alloy is generally classified into two types; (1) first alloy being composed of 0.05–2.8% Mg and the balance Cu and inevitable impurities, (2) second alloy composed of 0.05–2.8% Mg, up to 1% Ca, and the balance Cu and inevitable impurities. In the present specification and claims, all percentages indicate the percent by weight. The specific ratios of Mg and Ca occupied in the alloys of this invention are very significant and critical as hereinafter described more in detail.

BRIEF DESCRIPTION OF THE TABLES

Table No. 1 shows, as examples, the chemical compositions of the alloys for tubes in accordance with the present invention invention in comparison with that of the conventional and well-known copper tubes for waterworks (JIS H 3603 seamless copper water tube corresponding to ASTM B 88-75 phosphorous deoxidized copper tube).

Table No. 2 shows examples of test results with respect to the dissolution of copper ions under different temperature conditions and different staying hours.

Table No. 3 shows examples of test results with respect to the dissolution of copper ions (1) in the case of stagnant hot-water supply over the range of various staying hours and (2) in the case of water once heated and left cooling down naturally, classified by the frequency of the test repetition.

DETAILED DESCRIPTION

In many developed countries water supply sources tend to be contaminated or deteriorated in water quality or purity by various causes, as chemicals are added into the water in some water purification plants for the purpose of preserving the water quality. This situation accelerates, in turn, the dissolution rate in water of an element or elements of the material of tubes for water supply, giving rise to problems from the viewpoint of sanitation and preservation of water quality. Provision of a suitable material of tubes for water supply superior in reducing the dissolution rate in water of an element or elements thereof in, workablity, and in saving of manufacturing cost has been urgently needed. It is an object of the present invention to meet the aforementioned requirements for providing excellent tubes. The present successful solution to these problems was arrived at after carrying out many timeconsuming experiments with respect to the dissolution rate of various elements into water under various conditions such as temperature and duration of time. The essential matter of this invention is to provide a tube made of one of two types of copper base alloys (1) one is a copper base alloy consisting essentially of 0.05–2.8% Mg and the balance is Cu and inevitable impurities, (2) the other is a copper base alloy consisting essentially of 0.05–2.8% Mg, up to 1% Ca and the balance Cu and inevitable impurities.

Mg as an ingredient of the alloy is surprisingly effective in restraining the dissolution rate of copper ions (cupric ions) into water and also contributive to improvement of strength of the alloy. In case the Mg content is lower than 0.05% said effect, however, can not be recognized, and in case the content exceeds 2.8%, i.e., the maximum solid solubility of Mg in Cu, workability in pipe-making is degraded. Ca content up to 1% coexisting with Mg 0.05-2.8% is effective in further restraining the dissolution rate of the copper ions (cupric ions). Addition of Ca exceeding 1% is harmful in workability of the material into tubes and renders the manufacture of good products very difficult.

In manufacturing tubes in accordance with this invention such elements as Si, Ni, Fe, Mn, Ag, Ti, V, Al, Sn, Li, P, Zr, Be, Nb, B, Co, Cr, Na, K, Ta, Te, Mo, Ba, W, Sb, etc., may be present and allowable individually or in combination up to the limit of the solid solubility of each element. Presence of these elements is harmless to the properties of the tubes of this invention; and what is more, such elements as Si, Ni, Fe, Mn, Ag, Ti, and V are contributive to the improvement of the strength, and Al and Li are respectively effective in the formation of a protective skin layer.

Besides, P, Zr, Be, Nb and B are all effective as deoxidizers and contributive to the improvement of castability. As for Zn, however, it is desirable to be limited within 1.0%.

The Cu-alloy tubes of this invention which were prepared for the tests were manufactured in the following steps:

(1) a step to make an ingot of 200 mm$\phi$ by way of a semicontinuous casting;

(2) another step in which the ingot undergoes a hot extrusion, followed by shaving-off;

(3) a further step to finish the above product into tubes to have the external diameter 28.0-28.5 mm$\phi$ and the wall thickness 1.0-3.2 mm in the course of repetition of cold drawing and annealed softening alternately; and then, (4) the tubes are softened in a bright annealing furnace at the temperature of 550°-600° C.

The steps above-mentioned are substantially identical with the conventional method of making copper tubes for waterworks; but the product of the present invention is superior in strength than the traditional copper tubes.

As for the tests of the alloy tubes the following considerations were made and the under-mentioned three test items were carried out (and when carrying out the tests alloy tubes cut in the length of 300 mm were prepared): (a) the fact that the dissolution rate depends also upon time and temperature; (b) when a copper tube is used for water or hot-water supply, the dissolution rate of the copper ions largely depends on the conditions of the water; for example, if hot-water is left staying in a tube naturally to cool down the dissolved amount of copper ions will increase.

Three test items which were executed on the basis of the above prerequisites were as follows:

[I.] Water of the municipal waterworks of NAGOYA CITY, one of the three major cities of JAPAN, was taken as a sample. The water was put into each of the alloy tubes and classified into two groups of temperature zones, i.e., one of 3°-7° C. and the other of 22°-25° C. After letting them remain therein at a respective constant temperature of each range for one hour, six hours, fifteen hours, twenty-four hours, and forty-eight hours, ranging over five steps of time duration, analysis of the staying water in each pipe was executed with respect to the amount of copper ions and other dissolved element or elements of the alloy tube in the water.

[II.] The waterworks water was put in each of the alloy pipes and the temperature of the pipes with water was raised up to 60°-90° C.; each of the pipes was kept in that range of temperature for one hour, six hours, fifteen hours, twenty-four hours, and forty-eight hours respectively. The water in each tube was analyzed to estimate the amount of copper ions and each of the dissolved elements of the alloy tube in the water.

[III.] The waterworks water was put in each alloy pipe and the temperature of each pipe with water was raised up to 60°-90° C.; each of them was left to cool down to room temperature (say from 10° to 25° C.) for twenty-four hours. Then the water was analyzed to measure the amount of copper ions and each of other elements dissolved from the Cu-alloy tube in the water. As to the quantitative analysis of the copper ions and each of the other dissolved elements of the alloy tube, a small amount of a mixture of hydrochloric acid and nitric acid was added into the water contained in a beaker in order to prevent the dissolved elements from being precipitated onto the beaker wall. Then the water was analyzed by the usual atomic absorption method.

From the appended tables, especially from the Tables 2 and 3, it can be evidently found that the amount of dissolved copper ions from the alloy tubes of this invention is conspicuously less than that from the conventional copper tubes for waterworks (see sample Nos. 1 and 2 in the Table 3); and that it holds true even when the water or hot-water is left still in the tubes for a long time. In Japan, for example, the Ministry of Health & Welfare regulates the upper limit of the copper content at 1.0 ppm as the limit of water-quality of clean water; the amount of dissolved copper in the case of this invention will never exceed the above limit; and the addition of Mg is evidently highly effective in restraining the solubility of copper. As is clearly seen in the case of Nos. 10, 11, 33, and 34 in the Tables 2 and 3 the addition of calcium up to 1.0% further restrains the solubility of copper.

The dissolution rate of magnesium from the alloy tubes of this invention increases with the increase of Mg added therein. The magnesium dissolution rate in the case of sample No. 7 wherein Mg content was highest, did not exceed the limit of 10 ppm (in most cases it was less than 5 ppm). The majority of clean waterworks in Japan, for example, the total hardness (as $CaCO_3$) is less than 100 ppm, so that the upper limit of the total hardness of clean water regulated by the order of the Ministry of Health & Welfare of Japan, i.e., 300 ppm, can not be exceeded due to the magnesium dissolved in the water from the alloy tubes of this invention.

The alloy tubes of this invention are, to sum up its features and properties, of high value in respect to not only (a) corrosion resistance, (b) superior workability in piping arrangement, (c) similar easiness of manufacturing as traditional tubes, (d) enough strength, and (e) low manufacturing cost but also in respect to high preservation of water quality because of its dissolution rate of Cu and Mg, the principal elements thereof, into the water and/or hot-water supply including drinking water.

TABLE 1

| test specimen No. | Cu | Mg | Ca | other elements |
|---|---|---|---|---|
| 1 | 99.95 | | | P 0.016 |
| 2 | 99.96 | | | P 0.025 |
| 3 | R | 0.05 | | |
| 4 | R | 0.48 | | |
| 5 | R | 1.02 | | |
| 6 | R | 2.18 | | |
| 7 | R | 2.80 | | |
| 8 | R | 0.47 | | P 0.026 |
| 9 | R | 2.70 | | P 0.030 |
| 10 | R | 1.89 | 0.60 | |
| 11 | R | 2.10 | 0.50 | P 0.030 |
| 12 | R | 1.99 | | Sn 1.02 |
| 13 | R | 1.83 | | Ni 0.63 |
| 14 | R | 1.58 | | Ni 1.81 |
| 15 | R | 1.89 | | Si 0.50 |
| 16 | R | 2.05 | | Ag 1.08 |
| 17 | R | 1.87 | | Ti 0.18 |
| 18 | R | 1.72 | | Mn 0.62 |
| 19 | R | 1.68 | | Co 0.87 |
| 20 | R | 1.76 | | V 0.12 |
| 21 | R | 1.91 | | Cr 0.80 |
| 22 | R | 1.85 | | Al 1.63 |
| 23 | R | 2.03 | | Li 0.02 |
| 24 | R | 1.65 | | Zr 0.02 |
| 25 | R | 1.57 | | Be 0.08 |
| 26 | R | 1.95 | | Nb 0.02 |
| 27 | R | 1.77 | | B 0.01 |
| 28 | R | 2.05 | | Sn 0.98 Si 0.60 |
| 29 | R | 2.13 | 0.38 | Al 0.90 Zr 0.01 |
| 30 | R | 1.98 | | P 0.020 Si 0.98 Al 0.78 |
| 31 | R | 2.01 | | Zn 0.80 |
| 32 | R | 1.98 | | Zn 1.08 |
| 33 | R | 0.96 | 0.45 | Zn 1.10 |
| 34 | R | 2.05 | 0.44 | Zn 0.90 |

TABLE 2

Analytical results of dissolved copper ions (ppm)

| test specimen No. | water temp. (3–7° C.) staying time (hrs) | | | | | water temp. (22–25° C.) staying time (hrs) | | | | |
|---|---|---|---|---|---|---|---|---|---|---|
| | 1 | 6 | 15 | 24 | 48 | 1 | 6 | 15 | 24 | 48 |
| 1 | 0.60 | 1.13 | 1.91 | 1.65 | 1.25 | 0.34 | 0.77 | 1.35 | 1.40 | 0.71 |
| 2 | 0.68 | 1.21 | 1.93 | 1.74 | 1.65 | 0.37 | 0.81 | 1.62 | 1.64 | 1.55 |
| 3 | 0.80 | 0.71 | 0.89 | 0.98 | 0.99 | 0.63 | 0.65 | 0.62 | 0.88 | 0.95 |
| 4 | 0.78 | 0.82 | 0.76 | 0.86 | 0.72 | 0.45 | 0.67 | 0.68 | 0.63 | 0.75 |
| 5 | 0.55 | 0.57 | 0.44 | 0.10 | 0.06 | 0.31 | 0.55 | 0.56 | 0.15 | 0.01 |
| 6 | 0.18 | 0.26 | 0.30 | 0.07 | 0.15 | 0.07 | 0.21 | 0.19 | 0.02 | 0.02 |
| 7 | 0.02 | 0.02 | 0.02 | 0.04 | 0.03 | 0.01 | 0.01 | 0.01 | 0.03 | 0.02 |
| 8 | 0.62 | 0.88 | 0.80 | 0.18 | 0.26 | 0.38 | 0.58 | 0.63 | 0.62 | 0.83 |
| 9 | 0.02 | 0.03 | 0.02 | 0.08 | 0.08 | 0.03 | 0.01 | 0.03 | 0.02 | 0.02 |
| 10 | 0.02 | 0.02 | 0.02 | 0.02 | 0.10 | 0.02 | 0.01 | 0.01 | 0.01 | 0.01 |
| 11 | 0.02 | 0.01 | 0.02 | 0.02 | 0.02 | 0.01 | 0.01 | 0.01 | 0.01 | 0.01 |
| 12 | 0.26 | 0.31 | 0.36 | 0.07 | 0.15 | 0.07 | 0.21 | 0.19 | 0.02 | 0.02 |
| 13 | 0.18 | 0.32 | 0.29 | 0.18 | 0.12 | 0.09 | 0.18 | 0.14 | 0.08 | 0.06 |
| 14 | 0.27 | 0.32 | 0.29 | 0.12 | 0.18 | 0.18 | 0.13 | 0.09 | 0.12 | 0.21 |
| 15 | 0.16 | 0.21 | 0.24 | 0.18 | 0.09 | 0.12 | 0.13 | 0.08 | 0.16 | 0.12 |
| 16 | 0.13 | | 0.25 | | 0.18 | 0.11 | | 0.18 | | 0.19 |
| 17 | 0.14 | | 0.11 | | 0.16 | 0.16 | | 0.14 | | 0.12 |
| 18 | 0.26 | | 0.34 | | 0.21 | 0.23 | | 0.17 | | 0.14 |
| 19 | 0.27 | | 0.32 | | 0.28 | 0.22 | | 0.29 | | 0.19 |
| 20 | 0.12 | | 0.15 | | 0.18 | 0.31 | | 0.27 | | 0.18 |
| 21 | 0.07 | | 0.16 | | 0.13 | 0.28 | | 0.21 | | 0.14 |
| 22 | 0.08 | | 0.11 | | 0.09 | 0.10 | | 0.09 | | 0.09 |
| 23 | 0.15 | | 0.18 | | 0.13 | 0.16 | | 0.15 | | 0.13 |
| 24 | 0.18 | | 0.28 | | 0.12 | 0.09 | | 0.17 | | 0.05 |
| 25 | 0.19 | | 0.24 | | 0.16 | 0.11 | | 0.13 | | 0.08 |
| 26 | 0.16 | | 0.21 | | 0.18 | 0.08 | | 0.09 | | 0.12 |
| 27 | 0.21 | | 0.14 | | 0.16 | 0.09 | | 0.12 | | 0.15 |
| 28 | 0.11 | | 0.25 | | 0.08 | 0.07 | | 0.14 | | 0.19 |
| 29 | 0.14 | | 0.17 | | 0.07 | 0.08 | | 0.13 | | 0.08 |
| 30 | 0.11 | | 0.12 | | 0.12 | 0.11 | | 0.18 | | 0.15 |
| 31 | 0.15 | | 0.21 | | 0.15 | 0.08 | | 0.13 | | 0.05 |
| 32 | 0.13 | | 0.22 | | 0.14 | 0.08 | | 0.12 | | 0.06 |
| 33 | 0.04 | | 0.06 | | 0.12 | 0.03 | | 0.02 | | 0.06 |
| 34 | 0.02 | | 0.02 | | 0.02 | 0.01 | | 0.01 | | 0.01 |

TABLE 3

Analytical results of dissolved copper ions (ppm)

| test specimen No. | in the case of water supply at a temp. between 60 and 90° C. staying time (hrs) | | | | | in the case of water supply raised to a temp. between 60 and 90° C. and left to cool down to the room temp. for 24 hours sequence order of tests | | | | mean value |
|---|---|---|---|---|---|---|---|---|---|---|
| | 1 | 6 | 15 | 24 | 48 | 1 | 2 | 3 | 4 | |
| 1 | 0.55 | 0.57 | 0.88 | 0.80 | 0.54 | 0.98 | 1.85 | 1.68 | 1.95 | 1.61 |
| 2 | 0.61 | 0.89 | 1.08 | 1.25 | 0.22 | 0.89 | 1.40 | 1.80 | 1.78 | 1.47 |

TABLE 3-continued

Analytical results of dissolved copper ions (ppm)

| test specimen No. | in the case of water supply at a temp. between 60 and 90° C. staying time (hrs) | | | | | in the case of water supply raised to a temp. between 60 and 90° C. and left to cool down to the room temp. for 24 hours sequence order of tests | | | | mean value |
|---|---|---|---|---|---|---|---|---|---|---|
| | 1 | 6 | 15 | 24 | 48 | 1 | 2 | 3 | 4 | |
| 3 | 0.75 | 0.55 | 0.85 | 0.10 | 0.28 | 0.50 | 0.61 | 0.81 | 0.71 | 0.66 |
| 4 | 0.53 | 0.35 | 0.62 | 0.17 | 0.04 | 0.32 | 0.44 | 0.68 | 0.67 | 0.53 |
| 5 | 0.55 | 0.05 | 0.13 | 0.07 | 0.17 | 0.29 | 0.21 | 0.40 | 0.41 | 0.38 |
| 6 | 0.03 | 0.05 | 0.23 | 0.05 | 0.07 | 0.09 | 0.04 | 0.04 | 0.03 | 0.05 |
| 7 | 0.02 | 0.03 | 0.16 | 0.03 | 0.04 | 0.07 | 0.04 | 0.03 | 0.04 | 0.05 |
| 8 | 0.55 | 0.41 | 0.45 | 0.12 | 0.09 | 0.41 | 0.52 | 0.61 | 0.62 | 0.59 |
| 9 | 0.03 | 0.05 | 0.18 | 0.05 | 0.04 | 0.09 | 0.05 | 0.03 | 0.04 | 0.05 |
| 10 | 0.03 | 0.02 | 0.04 | 0.02 | 0.04 | 0.10 | 0.06 | 0.04 | 0.04 | 0.06 |
| 11 | 0.03 | 0.03 | 0.05 | 0.02 | 0.02 | 0.08 | 0.06 | 0.03 | 0.04 | 0.05 |
| 12 | 0.05 | 0.08 | 0.29 | 0.07 | 0.09 | 0.11 | 0.08 | 0.02 | 0.07 | 0.07 |
| 13 | 0.05 | 0.07 | 0.31 | 0.08 | 0.07 | 0.11 | 0.15 | 0.07 | 0.04 | 0.09 |
| 14 | 0.08 | 0.08 | 0.41 | 0.12 | 0.11 | 0.08 | 0.09 | 0.11 | 0.07 | 0.09 |
| 15 | 0.06 | 0.09 | 0.29 | 0.13 | 0.10 | 0.07 | 0.09 | 0.08 | 0.12 | 0.09 |
| 16 | 0.09 | | 0.21 | | 0.08 | 0.09 | | 0.07 | | 0.08 |
| 17 | 0.08 | | 0.25 | | 0.09 | 0.04 | | 0.08 | | 0.06 |
| 18 | 0.12 | | 0.29 | | 0.11 | 0.09 | | 0.15 | | 0.12 |
| 19 | 0.11 | | 0.31 | | 0.08 | 0.12 | | 0.14 | | 0.13 |
| 20 | 0.10 | | 0.25 | | 0.06 | 0.09 | | 0.06 | | 0.08 |
| 21 | 0.06 | | 0.26 | | 0.04 | 0.16 | | 0.04 | | 0.10 |
| 22 | 0.06 | | 0.18 | | 0.06 | 0.08 | | 0.06 | | 0.07 |
| 23 | 0.05 | | 0.23 | | 0.07 | 0.04 | | 0.08 | | 0.06 |
| 24 | 0.08 | | 0.28 | | 0.09 | 0.21 | | 0.04 | | 0.18 |
| 25 | 0.09 | | 0.24 | | 0.09 | 0.13 | | 0.12 | | 0.13 |
| 26 | 0.11 | | 0.28 | | 0.08 | 0.08 | | 0.11 | | 0.10 |
| 27 | 0.08 | | 0.24 | | 0.06 | 0.16 | | 0.08 | | 0.12 |
| 28 | 0.03 | | 0.23 | | 0.06 | 0.07 | | 0.04 | | 0.06 |
| 29 | 0.04 | | 0.25 | | 0.07 | 0.04 | | 0.06 | | 0.05 |
| 30 | 0.06 | | 0.27 | | 0.09 | 0.06 | | 0.08 | | 0.07 |
| 31 | 0.02 | | 0.16 | | 0.06 | 0.07 | | 0.05 | | 0.04 |
| 32 | 0.03 | | 0.12 | | 0.04 | 0.05 | | 0.06 | | 0.05 |
| 33 | 0.04 | | 0.21 | | 0.08 | 0.08 | | 0.05 | | 0.06 |
| 34 | 0.03 | | 0.04 | | 0.02 | 0.08 | | 0.02 | | 0.04 |

Having thus described the invention, what is claimed as new and desired to be secured by Letters Patent is:

1. In a combination including potable water supply tubes in combination with a waterworks, the improvement wherein the tubes are made of a copper base alloy consisting essentially of 0.05-2.8% by weight magnesium, 0-1% calcium and the balance essentially copper.

2. A combination in accordance with claim 6 wherein at least one element selected from the group consisting of Si, Ni, Fe, Mn, Ag, Ti, V, Sn, Li, P, Zr, Be, Nb, B, Co, Cr, Na, K, Ta, Te, Mo, Ba, W, and Sb is present within the limit of solid solubility.

3. A combination in accordance with claim 1 wherein said alloy further includes calcium in a weight percent of up to 1.

4. A combination in accordance with claim 3, wherein at least one element selected from the group consisting of Si, Ni, Fe, Mn, Ag, Ti, V, Sn, Li, P, Zr, Be, Nb, B, Co, Cr, Na, K, Ta, Te, Mo, Ba, W, and Sb is present within the limit of solid solubility.

5. A combination in accordance with claim 1, wherein said alloy further includes silicon and/or aluminum present within the limit of solid solubility.

6. A combination in accordance with claim 5, wherein at least one element selected from the group consisting of Ni, Fe, Mn, Ag and Sn is present within the limit of solid solubility.

7. A combination in accordance with claim 5, wherein said alloy further includes calcium in a weight percent of up to 1.

* * * * *